(12) United States Patent
Agiwal

(10) Patent No.: US 11,659,519 B2
(45) Date of Patent: May 23, 2023

(54) METHOD AND APPARATUS FOR MONITORING PAGING IN EXTENDED DRX CYCLE IN A WIRELESS COMMUNICATION SYSTEM

(71) Applicant: Samsung Electronics Co., Ltd., Suwon-si (KR)

(72) Inventor: Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/301,411

(22) Filed: Apr. 1, 2021

(65) Prior Publication Data

US 2021/0314914 A1    Oct. 7, 2021

Related U.S. Application Data

(60) Provisional application No. 63/004,771, filed on Apr. 3, 2020.

(51) Int. Cl.
| | |
|---|---|
| *H04W 68/02* | (2009.01) |
| *H04W 76/28* | (2018.01) |
| *H04W 72/23* | (2023.01) |

(52) U.S. Cl.
CPC .......... *H04W 68/02* (2013.01); *H04W 72/23* (2023.01); *H04W 76/28* (2018.02)

(58) Field of Classification Search
CPC ........................... H04W 68/02; H04W 72/042; H04W 76/28; H04W 76/16
USPC ........................................................ 455/458
See application file for complete search history.

(56) References Cited

U.S. PATENT DOCUMENTS

| | | | | |
|---|---|---|---|---|
| 2017/0303235 | A1* | 10/2017 | Deogun | H04W 76/28 |
| 2018/0192436 | A1* | 7/2018 | Yl | H04W 72/14 |
| 2019/0028999 | A1* | 1/2019 | Yerramalli | H04B 1/7143 |
| 2022/0167270 | A1* | 5/2022 | Ye | H04L 5/0048 |

FOREIGN PATENT DOCUMENTS

| | | |
|---|---|---|
| CN | 106658602 A | 5/2017 |
| EP | 3094154 A1 | 11/2016 |
| EP | 3473043 A1 | 4/2019 |

(Continued)

OTHER PUBLICATIONS

Nokia, "Introduction of Rel-16 eMTC enhancements", Change Request, 3GPP TSG-RAN WG2 Meeting #109e, Feb. 24-Mar. 6, 2020, R2-2001870, 14 pages.

(Continued)

*Primary Examiner* — Hirdepal Singh

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure provides methods and apparatuses for monitoring paging in extended DRX cycles in a wireless communication system.

20 Claims, 4 Drawing Sheets

(56) References Cited

FOREIGN PATENT DOCUMENTS

WO      2017/157348 A1    9/2017
WO      2017222309 A1    12/2017

OTHER PUBLICATIONS

International Search Report dated Jun. 21, 2021 in connection with International Patent Application No. PCT/KR2021/004071, 4 pages.

\* cited by examiner

FIG. 2

```
RACH-ConfigDedicated : : =     SEQUENCE {
    cfra-TwoStep-r16          CFRA-2STEP
}
CFRA-2STEP : : =              SEQUENCE {
occasions                     SEQUENCE {
    rach-ConfigGeneric2step          RACH-ConfigGeneric,
ssb-perRACH-Occasion     ENUMERATED {oneEighth, oneFourth, oneHalf, one, two, four, eight, sixteen}
                              OPTIONAL - - Cond SSB-CFRA
   }
msgA-PUSCH-Resource-CFRA   MsgA-PUSCH-Resource-r16
msgA-SSB-sharedRO-MaskIndex-r16    INTEGER (1..15)
resources                  CHOICE {
      ssb                     SEQUENCE {
         ssb-ResourceList          SEQUENCE (SIZE(1..maxRA-SSB-Resources)) OF CFRA-SSB-Resource,
         ra-ssb-OccasionMaskIndex    INTEGER (0..15)
      },
      csirs                SEQUENCE {
         csirs-ResourceList         SEQUENCE (SIZE(1..maxRA-CSIRS-Resources)) OF CFRA-CSIRS-Resource,
         rsrp-ThresholdCSI-RS       RSRP-Range
      }
   },
}
CFRA-SSB-Resource : : =     SEQUENCE {
   ssb                  SSB-Index,
   ra-PreambleIndex           INTEGER (0..63),
PUSCHandDMRSIndex    PUSCH-DMRS-Index
   ...
}
CFRA-CSIRS-Resource : : =    SEQUENCE {
csi-RS              CSI-RS-Index,
ra-OccasionList           SEQUENCE (SIZE(1. .maxRA-OccasionsPerCSIRS)) OF INTEGER (0..maxRA-Occasions-1),
   ra-PreambleIndex            INTEGER (0. .63),
    PUSCHandDMRSIndexList   SEQUENCE (SIZE(1..maxRA-OccasionsPerCSIRS)) OF PUSCH-DMRS-Index
   ...
}

PUSCH-DMRS-Index::=           INTEGER (0. .X),

- - TAG-RACH-CONFIGDEDICATED-STOP
- - ASN1STOP
```

METHOD AND APPARATUS FOR MONITORING PAGING IN EXTENDED DRX CYCLE IN A WIRELESS COMMUNICATION SYSTEM

CROSS-REFERENCE TO RELATED APPLICATION

This application is based on and claims priority under 35 U.S.C. § 119(e) of a U.S. Provisional application Ser. No. 63/004,771, filed on Apr. 3, 2020, in the U.S. Patent and Trademark Office, the disclosure of each of which is incorporated by reference herein in its entirety.

BACKGROUND

1. Field

The disclosure relates to a wireless communication system. Specifically, the disclosure relates to an apparatus, a method, and a system for paging monitoring in extended discontinuous reception (DRX) cycle based on core network (CN) type in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FOAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Recently, there are needs to enhance current procedure for managing paging operation in next generation wireless communication system.

SUMMARY

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G).

In accordance with an aspect of the disclosure, a method performed by a user equipment (UE) is provided. The method comprises: receiving, from a base station, information on hyper frame numbering; receiving, from the base station, configuration information on an extended discontinuous reception (eDRX) cycle; identifying a paging hyper frame based on a length of the eDRX cycle included in the configuration information and a paging UE identity; identifying a starting radio frame and a last radio frame for a paging time window (PTW) in the paging hyper frame, wherein the starting radio frame of the PTW is identified based on the length of the eDRX cycle, the paging UE identity, and a paging frame offset included in the configuration information, and the last radio frame of the PTW is identified based on a configured length of the PTW; identifying at least one paging frame within the PTW and at least one physical downlink control channel (PDCCH) monitoring occasion corresponding to the at least one paging frame based on the configuration information; and monitoring a PDCCH addressed to a paging radio network temporary identifier (P-RNTI) in the identified at least one PDCCH monitoring occasion within the PTW.

Further, the paging UE identity includes at least one of a 5G-system architecture evolution-temporary mobile subscriber identity (5G-S-TMSI) or a full inactive-radio network temporary identifier (I-RNTI), and the paging hyper frame is identified based on a hashed identity of the paging UE identity.

Further, the UE stops monitoring, in case at least one of: receiving, from the base station, a first paging message including the 5G-S-TMSI as the paging UE identity within the PTW; receiving, from the base station, a second paging message including the full I-RNTI as the paging UE identity within the PTW, while the UE is in a radio resource control (RRC) inactive state; or receiving, from the base station, a short message indicating stop paging monitoring within the PTW.

Further, the paging hyper frame HF is identified as: (HF mod $T_{eDRX}$)=($UE_{ID,H}$ mod $T_{eDRX}$), where $UE_{ID,H}$ is the hashed identity, and $T_{eDRX}$ is the length of the eDRX cycle, and wherein the starting radio frame SF is identified as:

$$SF = PF_{offset} + \frac{1024}{X} \cdot \left(\left\lfloor \frac{UE_{ID,H}}{T_{eDRX}} \right\rfloor \bmod X\right),$$

where $PF_{offset}$ is the paging frame offset, and X is a parameter received from the base station.

Further, the configuration information further includes a length of a discontinuous reception (DRX) cycle of the UE, and a number of total paging frames in the DRX cycle, the DRX cycle is a paging monitoring cycle within the PTW, and the at least one paging frame PF within the PTW is identified as: (PF+$PF_{offset}$) mod T=(T div N) ($UE_{ID}$ mod N), where T is the length of the DRX cycle, N is the number of total paging frames in the DRX cycle, and $UE_{ID}$ is a value identified based on the paging UE identity.

In accordance with an aspect of the disclosure, a method performed by a base station is provided. The method comprises: transmitting, to a user equipment (UE), information on hyper frame numbering; transmitting, to the UE, configuration information on an extended discontinuous reception (eDRX) cycle; and transmitting, to the UE, a physical downlink control channel (PDCCH) addressed to a paging radio network temporary identifier (P-RNTI) in at least one PDCCH monitoring occasion within a paging time window (PTW), wherein a paging hyper frame is identified based on a length of the eDRX cycle included in the configuration information and a paging UE identity, wherein a starting radio frame of the PTW in the paging hyper frame is identified based on the length of the eDRX cycle, the paging UE identity, and a paging frame offset included in the configuration information, wherein a last radio frame of the PTW is identified based on a configured length of the PTW, and wherein at least one paging frame within the PTW and at least one PDCCH monitoring occasion corresponding to the at least one paging frame are identified based on the configuration information.

In accordance with an aspect of the disclosure, a user equipment (UE) is provided. The UE comprises: a transceiver configured to transmit and receive a signal; and a controller coupled with the transceiver and configured to: receive, from a base station, information on hyper frame numbering, receive, from the base station, configuration information on an extended discontinuous reception (eDRX) cycle, identify a paging hyper frame based on a length of the eDRX cycle included in the configuration information and a paging UE identity, identify a starting radio frame and a last radio frame for a paging time window (PTW) in the paging hyper frame, wherein the starting radio frame of the PTW is identified based on the length of the eDRX cycle, the paging UE identity, and a paging frame offset included in the configuration information, and the last radio frame of the PTW is identified based on a configured length of the PTW, identify at least one paging frame within the PTW and at least one physical downlink control channel (PDCCH) monitoring occasion corresponding to the at least one paging frame based on the configuration information, and monitor a PDCCH addressed to a paging radio network temporary identifier (P-RNTI) in the identified at least one PDCCH monitoring occasion within the PTW.

In accordance with an aspect of the disclosure, a base station is provided. The base station comprises: a transceiver configured to transmit and receive a signal; and a controller coupled with the transceiver and configured to: transmit, to a user equipment (UE), information on hyper frame numbering, transmit, to the UE, configuration information on an extended discontinuous reception (eDRX) cycle, and transmit, to the UE, a physical downlink control channel (PDCCH) addressed to a paging radio network temporary identifier (P-RNTI) in at least one PDCCH monitoring occasion within a paging time window (PTW), wherein a paging hyper frame is identified based on a length of the eDRX cycle included in the configuration information and a paging UE identity, wherein a starting radio frame of the PTW in the paging hyper frame is identified based on the length of the eDRX cycle, the paging UE identity, and a paging frame offset included in the configuration information, wherein a last radio frame of the PTW is identified based on a configured length of the PTW, and wherein at least one paging frame within the PTW and at least one PDCCH monitoring occasion corresponding to the at least one paging frame are identified based on the configuration information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 illustrates an example of a radio resource control (RRC) information element (IE) RACH-ConfigDedicated;

Throughout the drawings, like reference numerals will be understood to refer to like parts, components, and structures.

DETAILED DESCRIPTION

Figure 1:
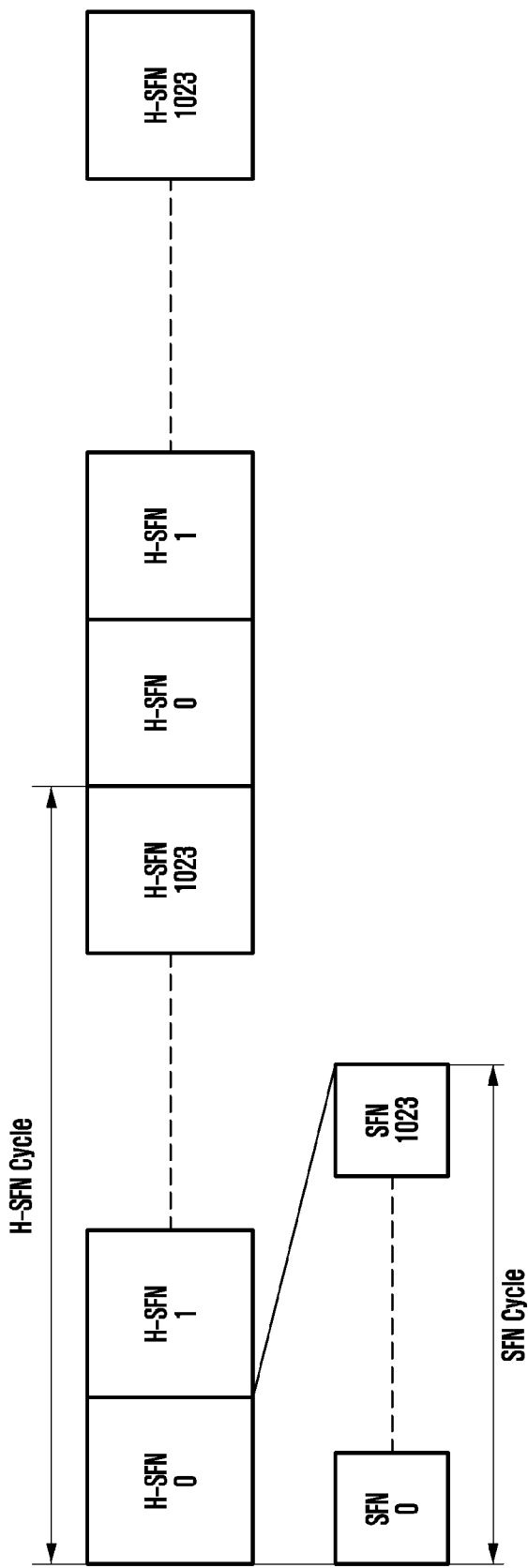
FIG. 1 illustrates an example of system frame number (SFN) and hyper-SFN (H-SFN) numbering.

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), 5G NB (5GNB), or gNB (next generation node B).

The "UE" is an entity communicating with a BS and may be referred to as UE, device, mobile station (MS), mobile equipment (ME), or terminal.

In the fifth generation wireless communication system operating in higher frequency (mmWave) bands, UE and gNB communicates with each other using beamforming. Beamforming techniques are used to mitigate the propagation path losses and to increase the propagation distance for communication at higher frequency band. Beamforming enhances the transmission and reception performance using a high-gain antenna. Beamforming can be classified into transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit beam patterns of different directions. Each of these transmit beam patterns can be also referred as TX beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of RX beam patterns of different directions. Each of these receive patterns can be also referred as RX beam.

In the fifth generation wireless communication system, node B (gNB) or base station in cell broadcast Synchronization Signal and physical broadcast channel (PBCH) block (SS/PBCH block or SSB) consists of primary and secondary synchronization signals (PSS, SSS) and system information. System information includes common parameters needed to communicate in cell. In the fifth generation wireless communication system (also referred as next generation radio or NR), System Information (SI) is divided into the MIB and a number of SIBs where:

the MIB is always transmitted on the PBCH with a periodicity of 80 ms and repetitions made within 80 ms and it includes parameters that are needed to acquire SIB1 from the cell.

the SIB1 is transmitted on the DL-SCH with a periodicity of 160 ms and variable transmission repetition. The default transmission repetition periodicity of SIB1 is 20 ms but the actual transmission repetition periodicity is up to network implementation. SIB1 includes information regarding the availability and scheduling (e.g., mapping of SIBs to SI message, periodicity, SI-window size) of other SIBs with an indication whether one or more SIBs are only provided on-demand and, in that case, the configuration needed by the UE to perform the SI request. SIB1 is cell-specific SIB;

SIBs other than SIB1 are carried in SystemInformation (SI) messages, which are transmitted on the DL-SCH. Only SIBs having the same periodicity can be mapped to the same SI message.

In the fifth generation wireless communication system, physical downlink control channel (PDCCH) is used to schedule downlink (DL) transmissions on physical downlink shared channel (PDSCH) and uplink (UL) transmissions on physical uplink shared channel (PUSCH), where the downlink control information (DCI) on PDCCH includes: downlink assignments containing at least modulation and coding format, resource allocation, and hybrid-automatic repeat request (ARQ) (HARD) information related to downlink shared channel (DL-SCH); uplink scheduling grants containing at least modulation and coding format, resource allocation, and HARQ information related to uplink shared channel (UL-SCH). In addition to scheduling, PDCCH can be used to for: activation and deactivation of configured PUSCH transmission with configured grant; activation and deactivation of PDSCH semi-persistent transmission; notifying one or more UEs of the slot format; notifying one or more UEs of the physical resource block(s) (PRB(s)) and orthogonal frequency division multiplexing (OFDM) symbol(s) where the UE may assume no transmission is intended for the UE; transmission of transmission power control (TPC) commands for physical uplink control channel (PUCCH) and PUSCH; transmission of one or more TPC commands for sounding reference signal (SRS) transmissions by one or more UEs; and switching a UE's active bandwidth part; Initiating a random access procedure. A UE monitors a set of PDCCH candidates in the configured monitoring occasions in one or more configured control resource sets (CORESETs) according to the corresponding search space configurations. A CORESET consists of a set of PRBs with a time duration of 1 to 3 OFDM symbols. The resource units resource element groups (REGs) and control channel elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries own demodulation reference signal (DMRS). Quadrature phase shift keying (QPSK) modulation is used for PDCCH.

In fifth generation wireless communication system, a list of search space configurations are signaled by GNB for each configured BWP wherein each search configuration is uniquely identified by an identifier. Identifier of search space configuration to be used for specific purpose such as paging reception, SI reception, random access response reception is explicitly signaled by gNB. In NR search space configuration comprises of parameters monitoring-periodicity-PDCCH-slot, monitoring-offset-PDCCH-slot, monitoring-symbols-PDCCH-within-slot and duration. A UE determines PDCCH monitoring occasion (s) within a slot using the parameters PDCCH monitoring periodicity (monitoring-periodicity-PDCCH-slot), the PDCCH monitoring offset (monitoring-offset-PDCCH-slot), and the PDCCH monitoring pattern (monitoring-symbols-PDCCH-within-slot). PDCCH monitoring occasions are there in slots "x" to x+duration where the slot with number "x" in a radio frame with number "y" satisfies the equation below:

$$(y*(\text{number of slots in a radio frame})+x-\text{Monitoring-offset-PDCCH-slot}) \bmod (\text{Monitoring-periodicity-PDCCH-slot})=0.$$

The starting symbol of a PDCCH monitoring occasion in each slot having PDCCH monitoring occasion is given by monitoring-symbols-PDCCH-within-slot. The length (in symbols) of a PDCCH monitoring occasion is given in the corset associated with the search space. Search space configuration includes the identifier of CORESET configuration associated with it. A list of CORESET configurations are signaled by GNB for each configured BWP wherein each CORESET configuration is uniquely identified by an identifier. Note that each radio frame is of 10 ms duration. Radio frame is identified by a radio frame number or system frame number (SFN). Each radio frame comprises of several slots wherein the number of slots in a radio frame and duration of slots depends on sub carrier spacing. The number of slots in a radio frame and duration of slots depends on a radio frame for each supported subcarrier spacing (SCS) is pre-defined in NR. Each CORESET configuration is associated with a list of transmission configuration indicator (TCI) states. One DL reference signal (RS) ID (either SSB or channel state information (CSI) RS (CSI-RS)) is configured per TCI state. The list of TCI states corresponding to a CORESET configuration is signaled by gNB via RRC signaling. One of the TCI state in TCI state list is activated and indicated to UE by gNB. TCI state indicates the DL TX beam (DL TX beam is quasi-co-located (QCLed) with SSB/CSI RS of TCI state) used by GNB for transmission of PDCCH in the PDCCH monitoring occasions of a search space.

In the 5th generation (also referred as NR or new radio) wireless communication system UE can be in one of the following RRC state: RRC IDLE, RRC INACTIVE and RRC CONNECTED. The RRC states can further be characterized as follows:

In an RRC_IDLE state, a UE specific DRX may be configured by upper layers (i.e., NAS). The UE: monitors short messages transmitted with paging-radio network temporary identifier (P-RNTI) over DCI; monitors a paging channel for CN paging using 5G-S-TMSI; performs neighboring cell measurements and cell (re-) selection; and acquires system information and can send SI request (if configured).

In an RRC_INACTIVE state, a UE specific DRX may be configured by upper layers or by RRC layer; in this state, a UE stores the UE inactive AS context. A RAN-based notification area is configured by RRC layer. The UE monitors short messages transmitted with P-RNTI over DCI; monitors a paging channel for CN paging using 5G-S-TMSI and RAN paging using full inactive-radio network temporary identifier (I-RNTI); performs neighboring cell measurements and cell (re-)selection; performs RAN-based notification area updates periodically and when moving outside the configured RAN-based notification area; and acquires system information and can send SI request (if configured).

In an RRC_CONNECTED state, the UE stores the AS context. Unicast data is transmitted/received to/from UE. At lower layers, the UE may be configured with a UE specific DRX. The UE: monitors short messages transmitted with P-RNTI over DCI, if configured; monitors control channels associated with the shared data channel to determine if data is scheduled for it; provides channel quality and feedback information; performs neighboring cell measurements and measurement reporting; and acquires system information.

<<Paging in E-UTRAN Connected to EPC>>

The 4th generation wireless communication system (also referred as Evolved Universal Terrestrial Radio Access Network or E-UTRAN), consists of eNBs, providing the E-UTRA user plane (PDCP/RLC/MAC/PHY) and control plane (RRC) protocol terminations towards the UE. The eNBs are interconnected with each other by means of the X2 interface. The eNBs are also connected by means of the S1 interface to the evolved packet core (EPC), more specifically to the mobility management entity (MME) by means of the S1-MME interface and to the serving gateway (S-GW) by means of the S1-U interface. The S1 interface supports a many-to-many relation between MMEs/serving gateways and eNBs.

<Paging Using DRX Cycle in E-UTRAN Connected to EPC>

In E-UTRAN, the UE may use discontinuous reception (DRX) in idle mode in order to reduce power consumption. One paging occasion (PO) is a subframe where there may be P-RNTI transmitted on PDCCH addressing the paging message. One paging frame (PF) is one radio frame, which may contain one or multiple paging occasion(s). When DRX is used the UE needs only to monitor one PO per DRX cycle. PF and PO are determined by following formulae using the DRX parameters provided in system information.

Each radio frame is identified by a system frame number (SFN). SFN range is from 0 to 1023. PF is a radio frame which satisfies the following equation:

SFN mod $T=(T$ div $N)*(UE\_ID$ mod $N)$.

Index i_s pointing to PO corresponding to PF is derived from following calculation:

$i\_s=floor(UE\_ID/N)$ mod $Ns$.

The following Parameters are used for the calculation of the PF, i_s:

T: DRX cycle of the UE. T is determined by the shortest of the UE specific DRX value, if allocated by upper layers, and a default DRX value broadcast in system information. If UE specific DRX is not configured by upper layers, the default value is applied. In RRC_INACTIVE state, T is determined by the shortest of the RAN paging cycle, the UE specific paging cycle, and the default paging cycle, if allocated by upper layers;

nB: 4T, 2T, T, T/2, T/4, T/8, T/16, T/32, T/64, T/128, and T/256.

N: min (T, nB);

Ns: max (1, nB/T); and

UE_ID: IMSI mod 1024.

<Paging Using Extended DRX Cycle in E-UTRAN Connected to EPC>

The UE may be configured by upper layers with an extended DRX (eDRX) cycle $T_{eDRX}$. The UE may operate in extended DRX only if the UE is configured by upper layers and the cell indicates support for eDRX in System Information. A UE configured with eDRX monitors POs as defined earlier (i.e., based on the upper layer configured DRX value and a default DRX value), during a periodic paging time window (PTW) configured for the UE or until a paging message including the UE's NAS identity is received for the UE during the PTW, whichever is earlier. UE does not monitor PO in PF(s) according to equation descried earlier if those PF(s) are outside the PTW. The PTW is UE-specific and is determined by a paging hyperframe (PH), a starting position within the PH (PTW_start) and an ending position (PTW_end). PH, PTW_start and PTW_end are given by the following formulae.

The PH is the hyper system frame number (H-SFN) satisfying the following equation:

$H\text{-}SFN$ mod $T_{eDRX,H}=(UE\_ID\_H$ mod $T_{eDRX,H})$, where

A UE_ID_H: 10 most significant bits (MSBs) of the Hashed ID; and $T_{eDRX,H}$: eDRX cycle of the UE in Hyper-frames, ($T_{eDRX,H}=1, 2, \ldots, 256$ Hyper-frames) and configured by upper layers (i.e., NAS).

PTW_start denotes the first radio frame of the PH that is part of the PTW and has SFN satisfying the following equation:

$SFN=256*i_{eDRX}$, where $i_{eDRX}=floor(UE\_ID\_H/T_{eDRX,H})$ mod 4.

PTW_end is the last radio frame of the PTW and has SFN satisfying the following equation:

SFN=(PTW_start+$L$*100−1)mod 1024, where

L=paging time window length (in seconds) configured by upper layers.

Hashed_ID is defined as follows:

Hashed_ID is frame check sequence (FCS) for the bits b31, b30 . . . , b0 of S-TMSI.

S-TMSI=<b39, b38, . . . , b0> MME Code (8 bits), M TMSI (32 bits).

The 32-bit FCS may be the ones complement of the sum (modulo 2) of Y1 and Y2, where:

Y1 is the remainder of $x^k$ ($x^{31}+x^{30}+x^{29}+x^{28}+x^{27}+x^{26}+x^{25}+x^{24}+x^{23}+x^{22}+x^{21}+x^{20}+x^{19}+x^{18}+x^{17}+x^{16}+x^{15}+x^{14}+x^{13}+x^{12}+x^{11}+x^{10}+x^9+x^8+x^7+x^6+x^5+x^4+$ . . . $+x^3+x^2+x^1+1$) divided (modulo 2) by the generator polynomial $x^{32}+x^{26}+x^{23}+x^{22}+x^{16}+x^{12}+x^{11}+x^{10}+x^8+x^7+x^5+x^4+x^2+x+1$, where k is 32; and Y2 is the remainder of Y3 divided (modulo 2) by the generator polynomial $x^{32}+x^{26}+x^{23}+x^{22}+x^{16}+x^{12}+x^{11}+x^{10}+x^8+x^7+x^5+x^4+x^2+x+1$, where Y3 is the product of x32 by "b31, b30 . . . , b0 of S-TMSI", i.e., Y3 is the generator polynomial $x^{32}$ (b31*$x^{31}$+b30*$x^{30}$+ . . . +b0*1).

NOTE: The Y1 is 0xC704DD7B for any S-TMSI value.

However, there are some issues below in current paging using extended DRX cycle procedures.

In the 5th generation (also referred as NR or new radio) wireless communication system paging cycle is up to 2.56 seconds. It would be beneficial to extend paging DRX cycle in order of minutes to maximize UE power saving for UEs with very low data activity. The extended DRX cycle is supported in 4th generation wireless communication system. However, the beamforming aspects are not considered in extended DRX cycle design. So extended DRX cycle mechanism as defined in 4th generation wireless communication system needs to be enhanced considering beamforming.

<<Extended DRX Cycle in NR>>

In the $5^{th}$ generation (also referred as NR or new radio) wireless communication system, the UE uses discontinuous reception (DRX) in RRC_IDLE and RRC_INACTIVE state in order to reduce power consumption. In the RRC_IDLE/RRC_INACTIVE state UE wake ups at regular intervals (i.e., every DRX cycle) for short periods to receive paging, to receive SI update notification and to receive emergency notifications. Paging message is transmitted using physical downlink shared channel (PDSCH). Physical downlink common control channel (PDCCH) is addressed to P-RNTI if there is a paging message in PDSCH. P-RNTI is common for all UEs. UE identity (i.e., S-TMSI for RRC_IDLE UE or I-RNTI for RRC_INACTIVE UE) is included in paging message to indicate paging for a specific UE. A paging message may include multiple UE identities to page multiple UEs. A paging message is broadcasted (i.e., PDCCH is masked with P-RNTI) over data channel (i.e., PDSCH). SI update and emergency notifications are indicated in short message where the short message is included in DCI and PDCCH carrying this DCI is addressed to P-RNTI.

<Hyper Frame>

FIG. 1 illustrates an example of SFN and H-SFN numbering.

In order to support extended DRX cycle in NR wherein DRX cycle length can be in order of several minutes, concept of hyper frame needs to be introduced in NR. For receiving paging message and/or short message (or for receiving PDCCH addressed to P-RNTI) according to extended DRX cycle, a UE determines the hyper frame numbering based on information received from gNB. In NR each radio frame has a duration of 10 ms. The radio frames are sequentially numbered (i.e., assigned system frame number or SFN) from 0. The size of SFN is 10 bits. So SFN number wraps around after SFN 1023. A hyper frame consists of 1024 radio frames. The hyper frames are sequentially numbered (i.e., assigned hyper system frame number or H-SFN) from 0. In an embodiment, hyper frame can start from SFN 0 as shown in FIG. 1. In an alternate embodiment, hyper frame can start at an offset from SFN 0. This offset can be pre-defined or signaling by network (e.g., gNB/CN in SI/RRC/NAC signaling message). For example, is offset is 4, hyper frame starts from SFN 4 instead of SFN 0. In an embodiment, this offset same as the PF_offset signaled by network in paging configuration for determining paging frame. The size of H-SFN is X bits. So H-SFN number wraps around after H-SFN "$2^x−1$." In an embodiment the value of parameter "X" can be 10 as illustrated in FIG. 1. Other values of parameter "X" are not precluded. A parameter X can be pre-defined or can be signaled by gNB in system information, SFN is transmitted by gNB in PBCH. PBCH includes MIB and PBCH payload. 6 most significant bits (MSBs) of SFN are included in MIB and 4 least significant bits (LSBs) of SFN are included in PBCH payload. In an embodiment, H-SFN can be included in SIB1; H-SFN included in SIB1 is the H-SFN of hyper frame in which that SIB1 is transmitted. In an alternate embodiment, "p" MSBs of H-SFN are included in PBCH and remaining LSBs are included in SIB1, "p" is an integer. The value of "p" can be pre-defined or can be signaled by gNB, example in MIB. In an alternate embodiment, H-SFN is included in MIB.

<Extended DRX Cycle Length>

For monitoring paging or for receiving paging message and/or short message (or for receiving PDCCH addressed to P-RNTI) according to extended DRX cycle, a UE needs to know the length of extended DRX cycle. In an embodiment, the length of extended DRX cycle is signaled by network. The length is in unit of hyper frames. The length of extended DRX cycle can be signaled by 5G CN (or AMF) to a UE using NAS signaling message. The length of extended DRX cycle can be signaled by gNB in dedicated RRC signaling message. The length of extended DRX cycle can be signaled by gNB in broadcast signaling (e.g., system information). If multiple extended DRX cycle lengths are available to UE, it monitors paging in extended DRX cycle based on minimum of all the extended DRX cycle lengths. In an embodiment, if UE is in RRC_INACTIVE state, it monitors paging according to extended DRX cycle length which is minimum of [extended DRX cycle length signaled by AMF, extended DRX cycle length signaled by gNB for RRC_INACTIVE, if signaled]. Extended DRX cycle length signaled by gNB for RRC_INACTIVE can be signaled in SI or in dedicated signaling (e.g., in connection release). In an embodiment, if UE is in RRC_INACTIVE state, it does not monitor paging or receive paging message and/or short message (or receive PDCCH addressed to P-RNTI) according to extended DRX cycle, it monitors paging or receives paging message and/or short message (or receive PDCCH addressed to P-RNTI) according to non-extended DRX cycle. In an embodiment, if UE is in RRC_INACTIVE state and it has not received extended DRX cycle configuration or it has not received indication (indication can be in connection release message or system information or any other RRC message) from gNB to monitoring paging or to receive paging message and/or short message (or receive PDCCH addressed to P-RNTI) according to extended DRX cycle, it does not monitors paging or receive paging message and/or short message (or receive PDCCH addressed to P-RNTI) according to extended DRX cycle, it monitors paging or receive paging message and/or short message (or receive PDCCH addressed to P-RNTI) according to non-extended DRX cycle. In an embodiment, if UE is in RRC_IDLE state, it monitors paging according to extended DRX cycle length which is minimum of [extended DRX cycle length signaled by AMF, extended DRX cycle length signaled by gNB for RRC_IDLE, if signaled]. Extended DRX cycle length signaled by gNB for RRC_IDLE can be signaled in SI. Extended DRX cycle length signaled by gNB for RRC_IDLE and RRC_INACTIVE can be same.

<Paging Hyper Frame>

For monitoring paging or for receiving paging message and/or short message (or for receiving PDCCH addressed to P-RNTI) according to extended DRX cycle, UE needs to know the length of extended DRX cycle, UE determines paging hyper frame. In an embodiment Paging hyper frame is the H-SFN which satisfies, H-SFN mod $T_{eDRX,H}$=(UE_ID mod $T_{eDRX,H}$), where $T_{eDRX,H}$ is the length of extended DRX cycle as determined earlier.

A UE_ID is "A" most significant bits of the Frame Check Sequence (FCS) for "B" LSBs of 5G S-TMSI. 5G S-TMSI is 48 bits comprising of AMF Set ID (10 bits), AMF pointer (6 bits) and 5G TMSI (32 bits). "A" and "B" are integers. In an embodiment "A" is 10 and "B" is 32. A and B can be pre-defined or signaled by network in dedicated signaling (e.g., RRC message or NAS message) or broadcast signaling (e.g., system information).

A UE_ID is 5G S-TMSI mod 1024, or

A UE_ID is I-RNTI mod 1024 (for UE in RRC_INACTIVE state), or

A UE_ID is "A" most significant bits of the frame check sequence (FCS) for the bits "B" LSBs of I-RNTI (for UE in RRC_INACTIVE state). "A" and "B" are integers. In an embodiment "A" is 10 and "B" is 32. A and B can be pre-defined or signaled by network in dedicated signaling (e.g., RRC message or NAS message) or broadcast signaling (e.g., system information). Note that in above operation, instead of "mod 1024," other values such as mod 2048, or mod 4096, etc. can also be used.

In another embodiment paging hyper frame is the H-SFN which satisfies, H-SFN mod $T_{eDRX,H}$=0, where $T_{eDRX,H}$ is the length of extended DRX cycle as determined earlier.

In another embodiment paging hyper frame is the H-SFN which satisfies, H-SFN mod $T_{eDRX,H}$=paging hyper frame offset, where $T_{eDRX,H}$ is the length of extended DRX cycle. Offset is signaled by network (e.g., AMF/CN/gNB). Paging hyper frame offset can be common for all UEs or it can be signaled in a UE specific manner where same offset can be signaled by network to one or more UEs. Paging hyper frame offset can be signaled in units of number of paging hyper frames.

In another embodiment paging hyper frame is the H-SFN which satisfies, H-SFN mod $T_{eDRX,H}$= ($T_{eDRX,H}$ div $N_{eDRX,H}$)*(UE_ID mod $T_{eDRX,H}$), where $T_{eDRX,H}$ is the length of extended DRX cycle, $N_{eDRX,H}$ is the number of paging hyper frames and signaled by network. The $N_{eDRX,H}$ can be signaled by 5G CN (or AMF) to a UE. The $N_{eDRX,H}$ can be signaled by gNB in dedicated RRC signaling. The $N_{eDRX,H}$ can be signaled by gNB in broadcast signaling (e.g., system information). $N_{eDRX,H}$ can be $T_{eDRX,H}$, $T_{eDRX,H}$/2, $T_{eDRX,H}$/4, $T_{eDRX,H}$/8, $T_{eDRX,H}$/16 and so on.

A UE_ID is "A" most significant bits of the Frame Check Sequence (FCS) for "B" LSBs of 5G S-TMSI. 5G S-TMSI is 48 bits comprising of AMF Set ID (10 bits), AMF pointer (6 bits) and 5G TMSI (32 bits). "A" and "B" are integers. In an embodiment "A" is 10 and "B" is 32. A and B can be pre-defined or signaled by network in dedicated signaling (e.g., RRC message or NAS message) or broadcast signaling (e.g., system information).

A UE_ID is 5G S-TMSI mod 1024, or

A UE_ID is I-RNTI mod 1024 (for UE in RRC_INACTIVE state), or

A UE_ID is "A" most significant bits of the frame check sequence (FCS) for the bits "B" LSBs of I-RNTI (for UE in RRC_INACTIVE state). "A" and "B" are integers. In an embodiment "A" is 10 and "B" is 32. A and B can be pre-defined or signaled by network in dedicated signaling (e.g., RRC message or NAS message) or broadcast signaling (e.g., system information). Note that in above operation, instead of "mod 1024," other values such as mod 2048, or mod 4096, etc. can also be used.

<Starting of Paging Time Window>

For monitoring paging or for receiving paging message and/or short message (or for receiving PDCCH addressed to P-RNTI) according to extended DRX cycle, a UE needs to know the length of extended DRX cycle, according to extended DRX cycle, upon determining the paging hyper frame, UE determines the paging time window (PTW). In an embodiment, PTW_start denotes the first radio frame of the paging hyper frame that is part of the PTW and has SFN which satisfies, SFN=256*$i_{eDRX}$, where $i_{eDRX}$=floor (UE_ID/$T_{eDRX,H}$) mod 4. Here SFN corresponds to system frame number of radio frames within the paging hyper frame.

A UE_ID is "A" most significant bits of the frame check sequence (FCS) for "B" LSBs of 5G S-TMSI. 5G S-TMSI is 48 bits comprising of AMF Set ID (10 bits), AMF pointer (6 bits) and 5G TMSI (32 bits). "A" and "B" are integers. In an embodiment "A" is 10 and "B" is 32. A and B can be pre-defined or signaled by network in dedicated signaling (e.g., RRC message or NAS message) or broadcast signaling (e.g., system information).

A UE_ID is 5G S-TMSI mod 1024, or

A UE_ID is I-RNTI mod 1024 (for UE in RRC_INACTIVE state), or

A UE_ID is "A" most significant bits of the frame check sequence (FCS) for the bits "B" LSBs of I-RNTI (for UE in RRC_INACTIVE state). "A" and "B" are integers. In an embodiment "A" is 10 and "B" is 32. A and B can be pre-defined or signaled by network in dedicated signaling (e.g., RRC message or NAS message) or broadcast signaling (e.g., system information). Note that in above operation, instead of "mod 1024," other values such as mod 2048, or mod 4096, etc. can also be used.

In another embodiment, PTW_start denotes the first radio frame of the paging hyper frame that is part of the PTW and has SFN which satisfies, SFN=PTW offset+256*$i_{eDRX}$, where $i_{eDRX}$=floor(UE_ID/$T_{eDRX,H}$) mod 4. Here SFN corresponds to system frame number of radio frames within the paging hyper frame. In an embodiment, PTW_offset is the PF_offset signaled by network (e.g., gNB) in paging configuration for determining paging frame. In an embodiment PTW_offset can be different from PF_offset. In an embodiment, if PF_offset is not signaled, PTW_offset equals to zero is used. In an embodiment, if PTW_offset is not signaled, PTW_offset equals to zero is used.

- A UE_ID is "A" most significant bits of the frame check sequence (FCS) for "B" LSBs of 5G S-TMSI. 5G S-TMSI is 48 bits comprising of AMF Set ID (10 bits), AMF pointer (6 bits) and 5G TMSI (32 bits). "A" and "B" are integers. In an embodiment "A" is 10 and "B" is 32. A and B can be pre-defined or signaled by network in dedicated signaling (e.g., RRC message or NAS message) or broadcast signaling (e.g., system information).
- A UE_ID is 5G S-TMSI mod 1024, or
- A UE_ID is I-RNTI mod 1024 (for UE in RRC_INACTIVE state), or
- A UE_ID is "A" most significant bits of the Frame Check Sequence (FCS) for the bits "B" LSBs of I-RNTI (for UE in RRC_INACTIVE state). "A" and "B" are integers. In an embodiment "A" is 10 and "B" is 32. A and B can be pre-defined or signaled by network in dedicated signaling (e.g., RRC message or NAS message) or broadcast signaling (e.g., system information). Note that in above operation, instead of "mod 1024," other values such as mod 2048, or mod 4096, etc. can also be used.

In another embodiment, PTW_start denotes the first radio frame of the paging hyper frame that is part of the PTW and has SFN which satisfies, SFN=PTW_offset+$(1024/X)*i_{eDRX,H}$, where $i_{eDRX}$=floor(UE_ID/$T_{eDRX,H}$) mod X, where parameter "X" is signaled by network. Here SFN corresponds to system frame number of radio frames within the paging hyper frame. The parameter X can be signaled by 5G CN (or AMF) to UE. The parameter X can be signaled by gNB in dedicated RRC signaling. The parameter X can be signaled by gNB in broadcast signaling (e.g., system information). The parameter X can also be pre-defined e.g., it can be 1, 2, 4, 8, etc. The parameter X can be referred as number of PTWs in paging hyper frame. In an embodiment, PTW_offset is the PF_offset signaled by network in paging configuration for determining paging frame. In an embodiment PTW_offset can be different from PF_offset. In an embodiment, if PF_offset is not signaled, PTW_offset equals to zero is used. In an embodiment, if PTW_offset is not signaled, PTW_offset equals to zero is used. In an embodiment, "1024" in the equation SFN=PTW_offset+$(1024/X)*i_{eDRX}$ can be replaced by number of radio frames in a paging hyper frame. The number of radio frames in a paging hyper frame can be pre-defined or signaling by network (gNB/CN).

- A UE_ID is "A" most significant bits of the frame check sequence (FCS) for "B" LSBs of 5G S-TMSI. 5G S-TMSI is 48 bits comprising of AMF Set ID (10 bits), AMF pointer (6 bits) and 5G TMSI (32 bits). "A" and "B" are integers. In an embodiment "A" is 10 and "B" is 32. A and B can be pre-defined or signaled by network in dedicated signaling (e.g., RRC message or NAS message) or broadcast signaling (e.g., system information).
- A UE_ID is 5G S-TMSI mod 1024, or
- A UE_ID is I-RNTI mod 1024 (for UE in RRC_INACTIVE state), or
- A UE_ID is "A" most significant bits of the frame check sequence (FCS) for the bits "B" LSBs of I-RNTI (for UE in RRC_INACTIVE state). "A" and "B" is an integer. In an embodiment "A" is 10 and "B" is 32. A and B can be pre-defined or signaled by network in dedicated signaling (e.g., RRC message or NAS message) or broadcast signaling (e.g., system information). Note that in above operation, instead of "mod 1024," other values such as mod 2048, or mod 4096, etc. can also be used.

In another embodiment, PTW_start denotes the first radio frame of the paging hyper frame that is part of the PTW and has SFN which satisfies, SFN=$(1024/X)*i_{eDRX}$, where $i_{eDRX,H}$=floor(UE_ID/$T_{eDRX,H}$) mod X, where parameter "X" is signaled by network. Here SFN corresponds to system frame number of radio frames within the paging hyper frame. The parameter X can be signaled by 5G CN (or AMF) to UE. The parameter X can be signaled by gNB in dedicated signaling. The parameter X can be signaled by gNB in broadcast signaling (e.g., system information). The parameter X can also be pre-defined e.g., it can be 1, 2, 4, 8, etc. The parameter X can be referred as number of PTWs in paging hyper frame. In an embodiment, "1024" in the equation SFN=PTW_offset+$(1024/X)*i_{eDRX,H}$ can be replaced by number of radio frames in a paging hyper frame. The number of radio frames in a paging hyper frame can be pre-defined or signaling by network (gNB/CN).

- A UE_ID is "A" most significant bits of the frame check sequence (FCS) for "B" LSBs of 5G S-TMSI. 5G S-TMSI is 48 bits comprising of AMF Set ID (10 bits), AMF pointer (6 bits) and 5G TMSI (32 bits). "A" and "B" are integers. In an embodiment "A" is 10 and "B" is 32. A and B can be pre-defined or signaled by network in dedicated signaling (e.g., RRC message or NAS message) or broadcast signaling (e.g., system information).
- A UE_ID is 5G S-TMSI mod 1024. or
- A UE_ID is I-RNTI mod 1024 (for UE in RRC_INACTIVE state). or
- A UE_ID is "A" most significant bits of the frame check sequence (FCS) for the bits "B" LSBs of I-RNTI (for UE in RRC_INACTIVE state). "A" and "B" is an integer. In an embodiment "A" is 10 and "B" is 32. A and B can be pre-defined or signaled by network in dedicated signaling (e.g., RRC message or NAS message) or broadcast signaling (e.g., system information). Note that in above operation, instead of "mod 1024," other values such as mod 2048, or mod 4096, etc. can also be used.

<Ending of Paging Time Window>

In an embodiment, PTW_end is the last radio frame of the PTW and has SFN satisfying the following equation:

SFN=(PTW_start+Length of PTW in radio frames−1) mod 1024, where

Length of PTW can be signaled by network (e.g., gNB/CN).

If length of PTW is signaled in seconds, length of paging time window in radio frames=length of PTW in seconds*100.

In an embodiment, PTW_end is the last radio frame of the PTW and has SFN satisfying the following equation:

SFN=(PTW_start+Length of PTW in radio frames−1) mod (1024+PTW_Offset), where

Length of PTW can be signaled by network (e.g., gNB/CN).

If length of PTW is signaled in seconds, length of paging time window in radio frames=length of PTW in seconds*100.

In an embodiment, PTW_end is the last radio frame of the PTW and has SFN satisfying the following equation:

SFN=(PTW_start+Length of PTW in radio frames−1), where

Length of PTW can be signaled by network (e.g., gNB/CN).

If length of PTW is signaled in seconds, length of paging time window in radio frames−length of PTW in seconds*100.

<Paging Monitoring in Determined Paging Time Window>

For monitoring paging or for receiving paging message and/or short message (or for receiving PDCCH addressed to P-RNTI) according to extended DRX cycle, UE needs to know the length of extended DRX cycle, according to extended DRX cycle, upon determining the paging time window, UE determines the PF/PO for monitoring paging. UE first determine the PF within the determined the PTW. In the paging time window, there can be one or more paging frames (PFs) for UE. The SFN within the paging time window which satisfies below equation is the paging frame for UE.

(SFN+PF_offset)mod T=(T div N)*(UEID mod N)

PO is a set of PDCCH monitoring occasions for paging i.e., for monitoring PDCCH addressed to P-RNTI. After determining the PF within the PTW, a UE determines the PO of the UE i.e., the PDCCH monitoring occasions for monitoring PDCCH addressed to P-RNTI with respect to determined PF. The PDCCH monitoring occasions for paging are determined based on paging search space configuration (paging-SearchSpace) signaled by gNB.

A UE monitors the PO of the UE with respect to each of the PF(s) where PF is within the paging time window. The PDCCH monitoring occasions of PO may be outside the paging time window.
  For determining the PO with respect to the PF, UE first determines Index (i_s), indicating the index of the PO is determined by: i_s=floor (UEID/N) mod Ns. N and Ns are signaled by gNB.
  a UE then check the parameter paging-SearchSpace.
  When SearchSpaceId=0 is configured for paging-SearchSpace, the PDCCH monitoring occasions for paging are same as for RMSI. When SearchSpaceId=0 is configured for pagingSearchSpace, Ns is either 1 or 2. For Ns=1, there is only one PO which starts from the first PDCCH monitoring occasion for paging in the PF and in this case i_s is 0. For Ns=2, PO is either in the first half frame (i_s=0) or the second half frame (i_s=1) of the PF. If Ns=1 and i_s=0, PO monitored by UE is the set of PDCCH monitoring occasions (where set included PDCCH monitoring occasion for each transmitted SSB) for RMSI starting from first PDCCH monitoring occasion in the PF. If Ns=2 and i_s=0, PO monitored by UE is the set of PDCCH monitoring occasions for RMSI in the first half frame of PF. If Ns=2 and i_s=1, PO monitored by UE is the set of PDCCH monitoring occasions for RMSI in the second half frame of PF.
  When SearchSpaceId other than 0 is configured for pagingSearchSpace, the UE monitors the (i_s+1)th PO. The PDCCH monitoring occasions for paging are determined based on paging search space configuration (paging-SearchSpace) signaled by gNB. The PDCCH monitoring occasions for paging which are not overlapping with UL symbols (determined according to tdd-UL-DL-ConfigurationCommon) are sequentially numbered from zero starting from the 1st PDCCH monitoring occasion for paging in the PF and these are mapped to POs as explained below. The gNB may signal parameter firstPDCCH-MonitoringOccasionOfPO for each PO corresponding to a PF. When firstPDCCH-MonitoringOccasionOfPO is signaled, the (i_s+1)th PO is a set of 'S*X' consecutive PDCCH monitoring occasions for paging starting from the PDCCH monitoring occasion number indicated by firstPDCCH-MonitoringOccasionOfPO (i.e., the (i_s+1)th value of the firstPDCCH-MonitoringOccasionOfPO parameter). Otherwise, the (i_s+1)th PO is a set of "S*X" consecutive PDCCH monitoring occasions for paging starting from the (i_s*S*X)th PDCCH monitoring occasion for paging. "S" is the number of actual transmitted SSBs determined according to parameter ssb-PositionsInBurst signaled in SystemInformationBlock1 received from gNB. The parameter first-PDCCH-MonitoringOccasionOfPO is signaled in SIB1 for paging in initial DL BWP. For paging in a DL BWP other than the initial DL BWP, the parameter first-PDCCH-MonitoringOccasionOfPO is signaled in the corresponding BWP configuration. Parameter X is signaled by gNB. If not signaled, it is assumed to be 1. X is also referred as number of PDCCH monitoring occasions per SSB. Amongst the determined PDCCH monitoring occasions for paging corresponding to it PO, UE may monitor the PDCCH monitoring occasion corresponding to one of the transmitted SSB. Each PDCCH monitoring occasion of a PO is mapped to one of the transmitted SSB.

T is DRX cycle of the UE (note that this is different from extended DRX cycle length).

In an RRC_INACTIVE state, T is determined by the shortest of the UE specific DRX value configured by RRC, UE specific DRX value configured by NAS, and a default DRX value broadcast in system information.

In an RRC_IDLE state, T is determined by the shortest of UE specific DRX value configured by NAS, and a default DRX value broadcast in system information. If UE specific DRX is not configured by upper layers (i.e., NAS), the default value is applied.

N: number of total paging frames in T;

Ns: number of paging occasions for a PF;

PF_offset: offset used for PF determination;

UEID: 5G-S-TMSI mod 1024; and

Parameters Ns, nAndPagingFrameOffset, and the length of default DRX Cycle are signaled in SIB1. The values of N and PF_offset are derived from the parameter nAndPagingFrameOffset. If the UE has no 5G-S-TMSI, for instance when the UE has not yet registered onto the network, the UE may use as default identity UE_ID=0 in the PF and i_s formulas above In an embodiment, If PF_offset is not used in paging time window determination, a UE monitors POs corresponding to the PFs of the UE where the PFs are in PTW. One or more PDCCH monitoring occasion (s) of PO corresponding to PF may be located outside the PTW. In an embodiment, If PF_offset is used in paging time window determination, a UE monitors POs corresponding to the PFs of the UE where the PFs and POs are in PTW.

<Stop Monitoring Paging in PTW>

In the paging time window, there can be multiple paging frames (PFs) for UE and hence multiple POs for UE. In an embodiment, upon receiving paging message including the UE's NAS identity i.e., 5G S-TMSI in the PTW or If UE is in RRC Inactive state and configured with extended DRX cycle, upon reception of paging message with I-RNTI in PTW, UE stops monitoring paging in paging time window. In an embodiment, network can send paging stop indication (using a short message) in PTW. Upon receiving short message including paging stop indication in paging time window, UE stops monitoring paging in paging time window.

<<2 Step CFRA>>
<PUSCH Resource Signaling>

In an embodiment it is provided that PUSCH Resource configuration for 2 step CFRA is separately configured from PUSCH Resource configuration for 2 step CBRA.

For the PUSCH resource configuration for 2 step CBRA, msgA-PUSCH-ResourceList is included in common configuration of BWP. It is a list of MsgA-PUSCH-Resource. MsgA-PUSCH-Resource IE includes PUSCH parameters to determine PUSCH occasions. If 2 step RA is supported in a BWP and msgA-PUSCH-ResourceList is not included in common configuration of that BWP, msgA-PUSCH-ResourceList from initial BWP is used.

For the 2 step CFRA configuration, msgA-PUSCH-Resource-CFRA is included in RACH-ConfigDedicated IE of RRC Reconfiguration message. msgA-PUSCH-Resource-CFRA applies to BWP indicated by parameter first active uplink BWP. msgA-PUSCH-Resource-CFRA includes PUSCH parameters to determine PUSCH occasions. MCS/number of PRBs for each PUSCH occasion is part of msgA-PUSCH-Resource-CFRA MsgA-PUSCH-Resource/msgA-PUSCH-Resource-CFRA parameters:

frequencyStartMsgAPUSCH: UE determines first RB for a first PUSCH occasion in an UL BWP from frequencyStartMsgAPUSCH that provides an offset, in number of RBs in the UL BWP, from a first RB of the UL BWP.

nrofPRBsperMsgAPO: A PUSCH occasion includes a number of RBs provided by nrofPRBsperMsgAPO.

guardBandMsgAPUSCH: Consecutive PUSCH occasions in the frequency domain of an UL BWP are separated by a number of RBs provided by guardBandMsgAPUSCH.

nrMsgAPO-FDM: A number of PUSCH occasions in the frequency domain of an UL BWP is provided by nrMsgAPO-FDM.

msgAPUSCH-timeDomainOffset: UE determines a first slot for a first PUSCH occasion in an UL BWP from msgAPUSCH-timeDomainOffset that provides an offset, in number of slots in the UL BWP, relative to the start of each PRACH slot.

guardPeriodMsgAPUSCH: Consecutive PUSCH occasions within each slot are separated by guardPeriodMsgAPUSCH symbols and have same duration.

nrofMsgAPOperSlot: A number of time domain PUSCH occasions in each slot is provided by nrofMsgAPOperSlot.

nrofSlotsMsgAPUSCH: A number of consecutive slots that include PUSCH occasions is provided by nrofSlotsMsgAPUSCH.

startSymbolAndLengthMsgAPO: Starting symbol and length of PUSCH occasion in a PUSCH slot is given by startSymbolAndLengthMsgAPO.

msgA-DMRS-Configuration: A UE is provided a DMRS configuration for a PUSCH transmission in a PUSCH occasion in an active UL BWP by msgA-DMRS-Configuration.

msgA-MCS: A UE is provided an MCS for data information in a PUSCH transmission for a PUSCH occasion by msgA-MCS.

If msgA-PUSCH-Resource-CFRA is not signaled by GNB for 2 step CFRA:

a UE uses MsgA-PUSCH-Resource from msgA-PUSCH-ResourceList configured for 2 step CBRA. In case msgA-PUSCH-ResourceList includes both group A and group PUSCH resources:

a UE can use PUSCH Resource configuration corresponding to group A from configuration for 2 step CBRA; or a UE can use PUSCH Resource configuration corresponding to group B from configuration for 2 step CBRA; or The PUSCH Resource configuration (group A or group B) to be used from configuration for 2 step CBRA is indicated in 2 step CFRA configuration; or a UE can select PUSCH Resource configuration corresponding to group A or group B based on MsgA MAC PDU size.

E.g., if the potential MSGA payload size (UL data available for transmission plus MAC header and, where required, MAC CEs) is greater than group A, MsgA size and the pathloss is less than PCMAX (of the Serving Cell performing the Random Access Procedure)—preambleReceivedTargetPower—msgA-DeltaPreamble—messagePowerOffsetGroupB: select group B. Otherwise, select the group A.

FIG. 2 illustrates an example of an RRC information element RACH-ConfigDedicated.

In an embodiment, it is provided that for 2 step CFRA, in RACH-ConfigDedicated, RA preamble index, and PUSCHandDMRSIndex is signaled for one or more SSBs/CSI RSs. In an embodiment rach-ConfigGeneric2step (to provide ROs which are different from 2 step CBRA) can also be signaled in RACH-ConfigDedicated. In an embodiment msgA-SSB-sharedRO-MaskIndex can also be signaled in RACH-ConfigDedicated (note that msgA-SSB-sharedRO-MaskIndex is configured separately for 2 step CBRA and 2 step CFRA), in case ROs for 2 step CFRA are shared with 4 step and indicated which of the 4 step ROs are shared with 2 step CFRA. For a SSB, there can be several ROs and msgA-SSB-sharedRO-MaskIndex is used to indicate a subset of these ROs. PUSCHandDMRSIndexList indicates PUSCH-DMRS-Index for each RO in ra-OccasionList. i-th entry in PUSCHandDMRSIndexList corresponds to i-th entry in ra-OccasionList. In an embodiment, instead of PUSCHandDMRSIndexList for CSI-RS, one PUSCH occasion index can be there.

<PUSCH Occasion Indexing>

In an embodiment indexing is performed as follows:

In an embodiment, each PUSCH occasion corresponding to a PRACH slot is sequentially numbered (e.g., from zero), first, in increasing order of frequency resource indexes for frequency multiplexed PUSCH occasions; second, in increasing order of time resource indexes for time multiplexed PUSCH occasions within a PUSCH slot and Third, in increasing order of indexes for PUSCH slots corresponding to a PRACH slot.

A UE is provided a DMRS configuration for a PUSCH transmission in a PUSCH occasion in an active UL BWP by msgA-DMRS-Configuration. DMRS index is determined first in an ascending order of a DMRS port index and second in an ascending order of a DMRS sequence index.

PUSCHandDMRSIndex=PUSCH occasion index*maximum number of DMRS indexes+ DMRS Index.

For each [PUSCH occasion index, DMRS Index], PUSCHandDMRSIndex has a unique value. So, a UE can identify the PUSCH occasion index and DMRS index from PUSCHandDMRSIndex.

<PUSCH Occasion Selection for 2 Step CFRA Based on SSB>
- a UE first select SSB where selected SSB is the one for which SS-RSRP is above a configured threshold (threshold is signaled by gNB).
- a UE select preamble (indicated by ra-PreambleIndex) corresponding to selected SSB.
- a UE then select RO corresponding to selected SSB as specified in TS 38.321 (note that ROs are mapped to SSBs as defined earlier and UE select one of ROs mapped to selected SSB).
- a UE then select PUSCH occasion indicated by PUSCHandDMRSIndex from PUSCH occasions corresponding to PRACH slot of selected RO.
- a UE then transmit selected preamble and MsgA MAC PDU in selected PRACH occasion and PUSCH occasion respectively.

<PUSCH Occasion Selection for 2 Step CFRA Based on CSI-RS>
- a UE first select CSI-RS where selected CSI-RS is the one for which CSI-RSRP is above a configured threshold (threshold is signaled by gNB).
- a UE select preamble (indicated by ra-PreambleIndex) corresponding to selected CSI-RS.
- a UE then select RO (indicated by ra-OccasionList) corresponding to selected CSI-RS as specified in TS 38.321 (note that ROs are mapped to SSBs as defined earlier and UE select one of ROs mapped to selected SSB).
- a UE then select PUSCH occasion indicated by PUSCHandDMRSIndexList corresponding to selected CSI-RS.
- a UE then transmit selected preamble and MsgA MAC PDU in selected PRACH occasion and PUSCH occasion respectively.

Figure 3:
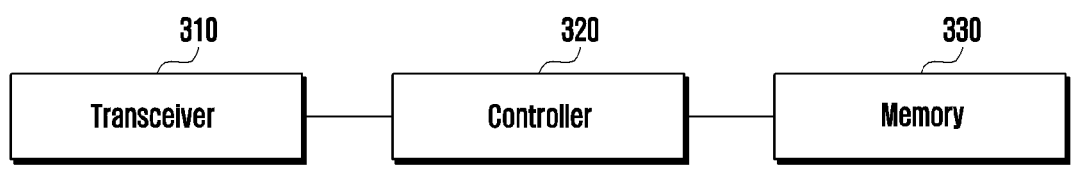
FIG. 3 illustrates a block diagram of a terminal according to an embodiment of the disclosure.

FIG. 3 illustrates a block diagram of a terminal according to an embodiment of the disclosure.

Referring to FIG. 3, a terminal includes a transceiver 310, a controller 320 and a memory 330. The controller 320 may refer to a circuitry, an application-specific integrated circuit (ASIC), or at least one processor. The transceiver 310, the controller 320 and the memory 330 are configured to perform the operations of the UE described above. Although the transceiver 310, the controller 320 and the memory 330 are shown as separate entities, they may be realized as a single entity like a single chip. Or the transceiver 310, the controller 320 and the memory 330 may be electrically connected to or coupled with each other.

The transceiver 310 may transmit and receive signals to and from other network entities, e.g., a base station.

The controller 320 may control the terminal to perform functions according to one of the embodiments described above. For example, the controller 320 controls the transceiver 310 and/or memory 330 to perform paging related operations according to various embodiments of the disclosure.

In an embodiment, the operations of the terminal may be implemented using the memory 330 storing corresponding program codes. Specifically, the terminal may be equipped with the memory 330 to store program codes implementing desired operations. To perform the desired operations, the controller 320 may read and execute the program codes stored in the memory 330 by using at least one processor or a central processing unit (CPU).

Figure 4:
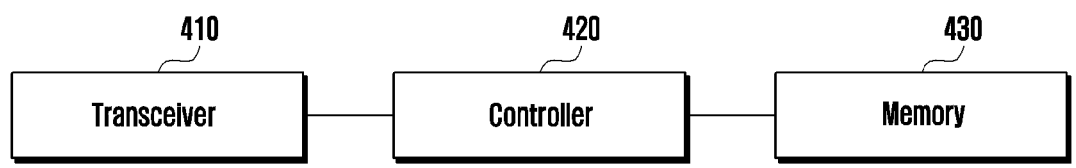
FIG. 4 illustrates a block diagram of a base station according to an embodiment of the disclosure.

FIG. 4 illustrates a block diagram of a base station according to an embodiment of the disclosure.

Referring to FIG. 4, a base station includes a transceiver 410, a controller 420 and a memory 430. The controller 420 may refer to a circuitry, an application-specific integrated circuit (ASIC), or at least one processor. The transceiver 410, the controller 420 and the memory 430 are configured to perform the operations of the base station described above. Although the transceiver 410, the controller 420 and the memory 430 are shown as separate entities, they may be realized as a single entity like a single chip. Or the transceiver 410, the controller 420 and the memory 430 may be electrically connected to or coupled with each other.

The transceiver 410 may transmit and receive signals to and from other network entities, e.g., a terminal.

The controller 420 may control the base station to perform functions according to one of the embodiments described above. For example, the controller 420 controls the transceiver 410 and/or memory 430 to perform paging related operations according to various embodiments of the disclosure.

In an embodiment, the operations of the base station may be implemented using the memory 430 storing corresponding program codes. Specifically, the base station may be equipped with the memory 430 to store program codes implementing desired operations. To perform the desired operations, the controller 420 may read and execute the program codes stored in the memory 430 by using at least one processor or a central processing unit (CPU).

While the disclosure has been shown and described with reference to various embodiments thereof, it will be understood by those skilled in the art that various changes in form and details may be made therein without departing from the spirit and scope of the disclosure as defined by the appended claims and their equivalents.

As described above, embodiments disclosed in the specification and drawings are merely used to present specific examples to easily explain the contents of the disclosure and to help understanding but are not intended to limit the scope of the disclosure. Accordingly, the scope of the disclosure should be analyzed to include all changes or modifications derived based on the technical concept of the disclosure in addition to the embodiments disclosed herein.

Although the present disclosure has been described with various embodiments, various changes and modifications may be suggested to one skilled in the art. It is intended that the present disclosure encompass such changes and modifications as fall within the scope of the appended claims.

What is claimed is:
1. A method performed by a terminal in a wireless communication system, the method comprising:
    identifying, in case that an extended discontinuous reception (eDRX) operation is configured for the terminal, a paging hyper frame (PH) based on an eDRX cycle and a user equipment (UE) identity (ID) associated with a hashed ID;
    identifying a first radio frame of a paging time window (PTW) in the PH, wherein the first radio frame has a first system frame number (SFN); and
    monitoring at least one paging occasion (PO) within the PTW based on the first radio frame, wherein the first SFN satisfies:

$$SFN = \left(\frac{1024}{X}\right) \times i_{eDRX},$$

where the $i_{eDRX}$ is identified based on floor(UE_ID_H/$T_{eDRX}$) mod X, the UE_ID_H is the user identity associated with the hashed ID, the $T_{eDRX}$ is a length of the eDRX cycle, and the X is a pre-defined value including 8.

2. The method of claim 1,
wherein the PH is a hyper-SFN (H-SFN) which satisfies:

H-SFN mod $T_{eDRX}$=(UE_ID_H mod $T_{eDRX}$), where the UE_ID_H is preconfigured bits of the hashed ID, the hashed ID is a frame check sequence (FCS) for 32 bits of fifth-generation (5G)-system architecture evolution (SAE)—temporary mobile subscriber identity (TMSI) (5G-S-TMSI), and the 5G-S-TMSI is 48 bits.

3. The method of claim 1, further comprising:
identifying a last radio frame of the PTW which has a second SFN satisfying:

SFN=(the first radio frame+L×100−1)mod 1024, where the L is a length of the PTW configured by an upper layer,
wherein the at least one PO is monitored within the PTW further based on the last radio frame.

4. The method of claim 1, wherein monitoring at least one PO further comprises:
identifying at least one paging frame for a SFN which is determined by:

(SFN+PF$_{\_offset}$)mod T=(T div N)*(UE_ID mod N)

where PF$_{\_offset}$ is a paging frame offset, the T is a discontinuous reception (DRX) cycle, the N is a number of paging frames in the DRX cycle, and the UE_ID is a paging UE ID; and
identifying the at least one PO for the at least one paging frame based on an index (i_s) of the at least one PO which is determined based on:

i_s=floor(UE_ID/N)mod Ns, where the Ns is a number of POs per paging frame.

5. The method of claim 4, further comprising:
monitoring physical downlink control channel (PDCCH) occasions for paging in the at least one PO.

6. A method performed by a base station in a wireless communication system, the method comprising:
identifying a paging hyper frame (PH) for paging a terminal for which an extended discontinuous reception (eDRX) operation is configured based on an eDRX cycle and a user equipment (UE) identity (ID) associated with a hashed ID;
identifying a first radio frame of a paging time window (PTW) in the PH, wherein the first radio frame has a first system frame number (SFN); and
transmitting, to the terminal, a paging message in at least one paging occasion (PO) within the PTW based on the first radio frame,
wherein the first SFN satisfies:

$$SFN = \left(\frac{1024}{X}\right) \times i_{eDRX},$$

where the $i_{eDRX}$ is identified based on floor(UE_ID_H/$T_{eDRX}$) mod X, the UE_ID_H is the user identity associated with the hashed ID, the $T_{eDRX}$ is a length of the eDRX cycle, and the X is a pre-defined value including 8.

7. The method of claim 6,
wherein the PH is a hyper-SFN (H-SFN) which satisfies:

H-SFN mod $T_{eDRX}$=(UE_ID_H mod $T_{eDRX}$), where the UE_ID_H is preconfigured bits of the hashed ID, the hashed ID is a frame check sequence (FCS) for 32 bits of fifth-generation (5G)-system architecture evolution (SAE)—temporary mobile subscriber identity (TMSI) (5G-S-TMSI), and the 5G-S-TMSI is 48 bits.

8. The method of claim 7, further comprising:
identifying a last radio frame of the PTW which has a second SFN satisfying:

SFN=(the first radio frame+L×100−1)mod 1024, where the L is a length of the PTW configured by an upper layer,
wherein the paging message is transmitted in the at least one PO further based on the last radio frame.

9. The method of claim 6,
wherein a SFN related to at least one paging frame is determined by:

(SFN+PF$_{\_offset}$)mod T=(T div N)*(UE_ID mod N), where PF$_{\_offset}$ is a paging frame offset, the T is a discontinuous reception (DRX) cycle, the N is a number of paging frames in the DRX cycle, and the UE_ID is a paging UE_ID, and
wherein the at least one PO for the at least one paging frame is identified based on an index (i_s) of the at least one PO which is determined based on:

i_s=floor(UE_ID/N)mod Ns, where the Ns is a number of POs per paging frame.

10. The method of claim 9,
wherein the at least one PO includes physical downlink control channel (PDCCH) occasions.

11. A terminal in a wireless communication system, the terminal comprising:
a transceiver configured to transmit and receive a signal; and
a controller coupled with the transceiver and configured to:
identify, in case that an extended discontinuous reception (eDRX) operation is configured for the terminal, a paging hyper frame (PH) based on an eDRX cycle and a user equipment (UE) identity (ID) associated with a hashed ID,
identify a first radio frame of a paging time window (PTW) in the PH, wherein the first radio frame has a first system frame number (SFN) and
monitor at least one paging occasion (PO) within the PTW based on the first radio frame,
wherein the first SFN satisfies:

$$SFN = \left(\frac{1024}{X}\right) \times i_{eDRX},$$

where the $i_{eDRX}$ is identified based on floor(UE_ID_H/$T_{eDRX}$) mod X, the UE_ID_H is the user identity associated with the hashed ID, the $T_{eDRX}$ is a length of the eDRX cycle, and the X is a pre-defined value including 8.

12. The terminal of claim 11, wherein the PH is a hyper-SFN (H-SFN) which satisfies:

$$H\text{-}SFN \bmod T_{eDRX} = (UE\_ID\_H \bmod T_{eDRX}),$$

where the UE_ID_H is preconfigured bits of the hashed ID, the hashed ID is a frame check sequence (FCS) for 32 bits of fifth-generation (5G)-system architecture evolution (SAE)—temporary mobile subscriber identity (TMSI) (5G-S-TMSI), and the 5G-S-TMSI is 48 bits.

13. The terminal of claim 11, wherein the controller is further configured to:
identify a last radio frame of the PTW which has a second SFN satisfying:

$$SFN=(\text{the first radio frame}+L\times100-1) \bmod 1024,$$

where the L is a length of the PTW configured by an upper layer,
wherein the at least one PO is monitored within the PTW further based on the last radio frame.

14. The terminal of claim 11, wherein the controller is further configured to:
identify at least one paging frame for a SFN which is determined by:

$$(SFN+PF_{\_offset}) \bmod T=(T \text{ div } N)*(UE\_ID \bmod N)$$

where $PF_{\_offset}$ is a paging frame offset, the T is a discontinuous reception (DRX) cycle, the N is a number of paging frames in the DRX cycle, and the UE_ID is a paging UE ID; and
identify the at least one PO for the at least one paging frame based on an index (i_s) of the at least one PO which is determined based on:

$$i\_s=\text{floor}(UE\_ID/N) \bmod Ns,$$

where the Ns is a number of POs per paging frame.

15. The terminal of claim 14, wherein the controller is further configured to:
monitor physical downlink control channel (PDCCH) occasions for paging in the at least one PO.

16. A base station in a wireless communication system, the base station comprising:
a transceiver configured to transmit and receive a signal; and
a controller coupled with the transceiver and configured to:
identify a paging hyper frame (PH) for paging a terminal for which an extended discontinuous reception (eDRX) operation is configured, based on an eDRX cycle and a user equipment (UE) identity (ID) associated with a hashed ID,
identify a first radio frame of a paging time window (PTW) in the PH, wherein the first radio frame has a first system frame number (SFN), and
transmit, to the terminal, a paging message in at least one paging occasion (PO) within the PTW based on the first radio frame,
wherein the first SFN satisfies:

$$SFN = \left(\frac{1024}{X}\right) \times i_{eDRX},$$

where the $i_{eDRX}$ is identified based on floor(UE_ID_H/$T_{eDRX}$) mod X, the UE_ID_H is the user identity associated with the hashed ID, the $T_{eDRX}$ is a length of the eDRX cycle, and the X is a pre-defined value including 8.

17. The base station of claim 16, wherein the PH is a hyper-SFN (H-SFN) which satisfies:

$$H\text{-}SFN \bmod T_{eDRX} = (UE\_ID\_H \bmod T_{eDRX}),$$

where the UE_ID_H is preconfigured bits of the hashed ID, the hashed ID is a frame check sequence (FCS) for 32 bits of fifth-generation (5G)-system architecture evolution (SAE)—temporary mobile subscriber identity (TMSI) (5G-S-TMSI), and the 5G-S-TMSI is 48 bits.

18. The base station of claim 17, wherein the controller is further configured to:
identify a last radio frame of the PTW which has a second SFN satisfying:

$$SFN=(\text{the first radio frame}+L\times100-1) \bmod 1024,$$

where the L is a length of the PTW configured by an upper layer,
wherein the paging message is transmitted in the at least one PO further based on the last radio frame.

19. The base station of claim 16, wherein a SFN related to at least one paging frame is determined by:

$$(SFN+PF_{\_offset}) \bmod T=(T \text{ div } N)*(UE\_ID \bmod N),$$

where $PF_{\_offset}$ is a paging frame offset, the T is a discontinuous reception (DRX) cycle, the N is a number of paging frames in the DRX cycle, and the UE_ID is a paging UE_ID, and
wherein the at least one PO for the at least one paging frame is identified based on an index (i_s) of the at least one PO which is determined based on:

$$i\_s=\text{floor}(UE\_ID/N) \bmod Ns,$$

where the Ns is a number of POs per paging frame.

20. The base station of claim 19, wherein the at least one PO includes physical downlink control channel (PDCCH) occasions.

* * * * *